March 15, 1927.  1,621,194
F. L. ELDER
THRASHING MACHINE
Filed Aug. 5, 1924  2 Sheets-Sheet 1
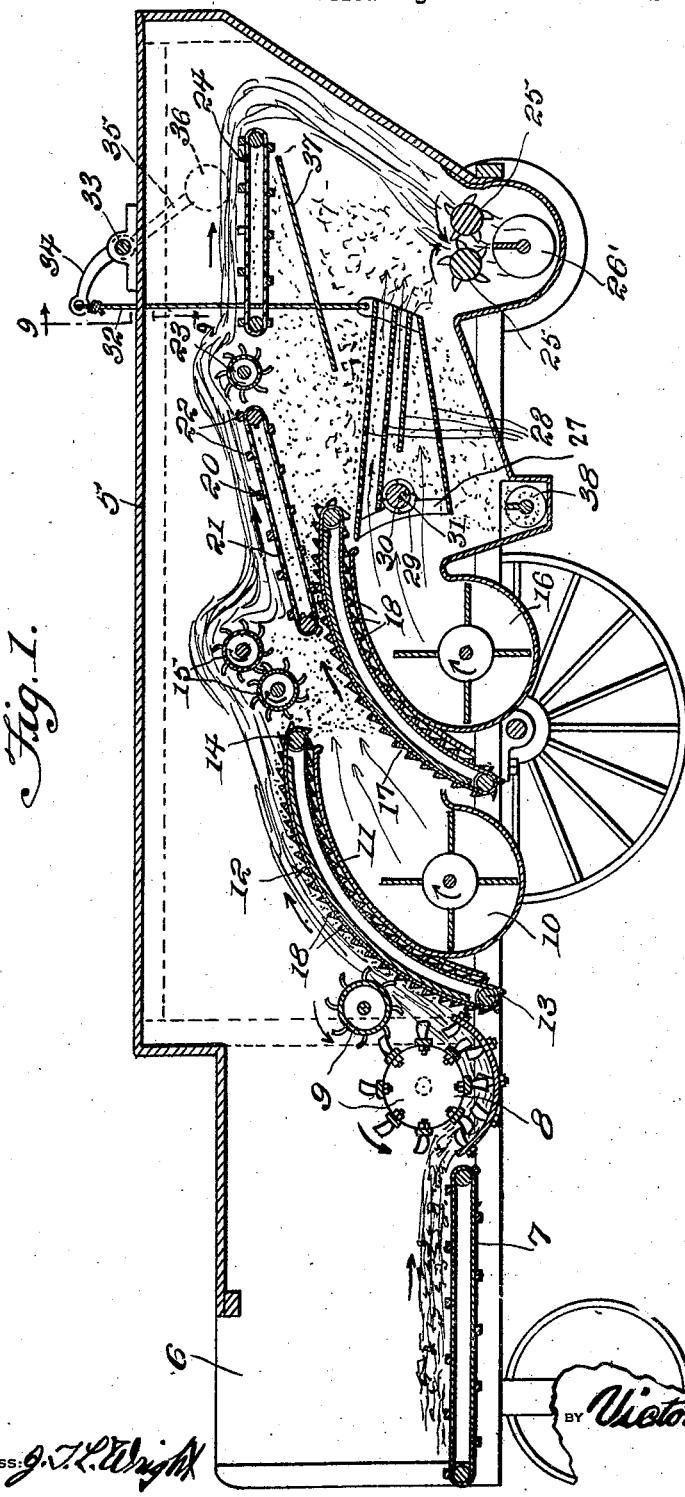
Fredrich L. Elder
INVENTOR
BY Victor J. Evans
ATTORNEY
WITNESS:

March 15, 1927.  F. L. ELDER  1,621,194
THRASHING MACHINE
Filed Aug. 5, 1924   2 Sheets-Sheet 2
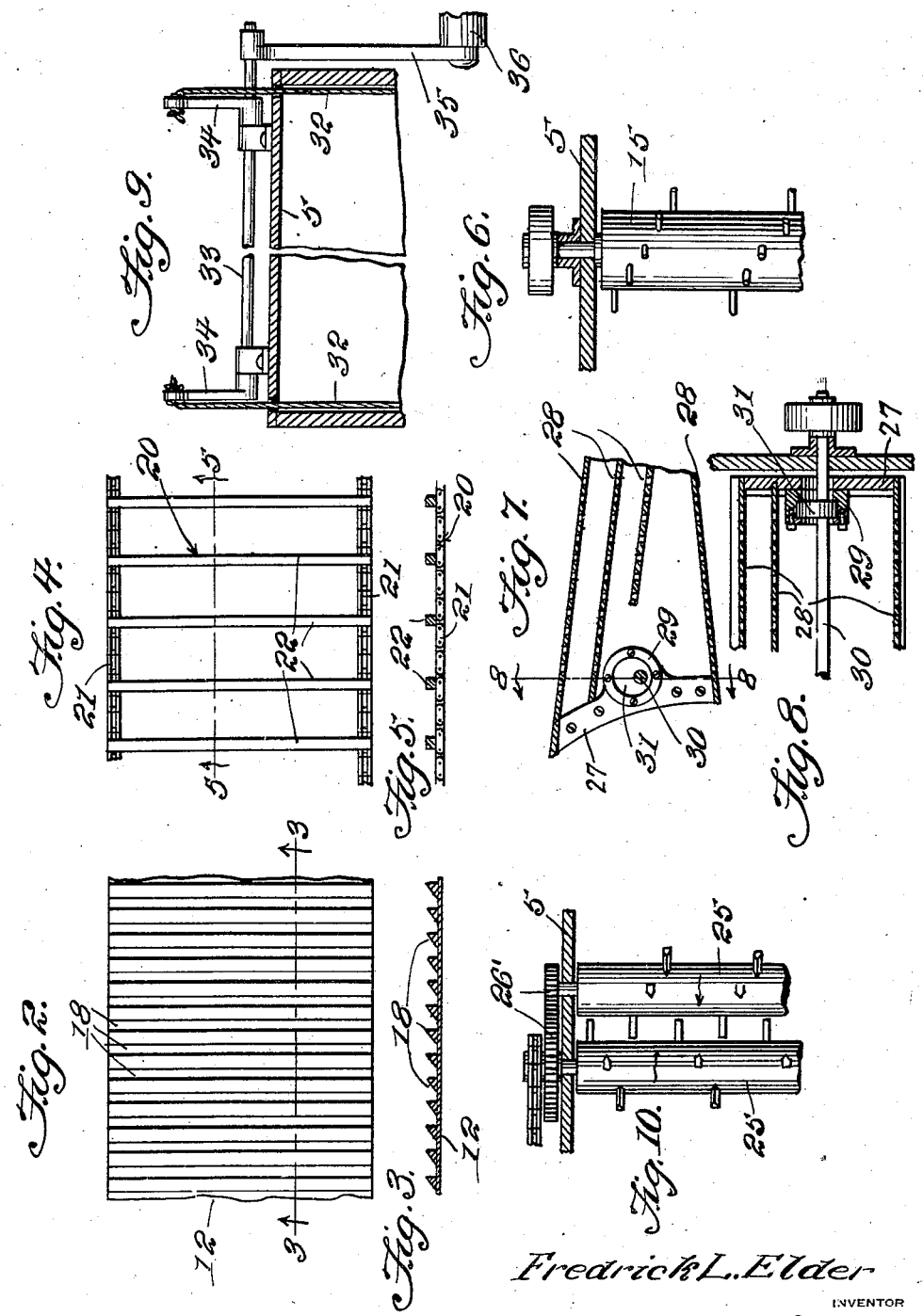
Fredrick L. Elder
INVENTOR
BY Victor J. Evans
ATTORNEY
WITNESS:

Patented Mar. 15, 1927.

1,621,194

UNITED STATES PATENT OFFICE.

FREDRICK L. ELDER, OF DAYTON, WASHINGTON.

THRASHING MACHINE.

Application filed August 5, 1924. Serial No. 730,277.

My invention relates to thrashing machines, and its principal object is to provide a machine of this character which will facilitate the thrashing operation and will clean or separate the grain from the chaff to a maximum degree.

Another object of the invention is to provide a thrashing machine which embodies a grain cleaner or separator which will be automatically dumped in the event that it becomes covered with straw.

With the preceding and other objects and advantages in mind, the invention consists in the combination of elements, construction and arrangement of parts and operation to be hereinafter explicitly referred to, claimed and illustrated in the accompanying drawing, wherein:—

Figure 1 is a longitudinal sectional view of a thrasher constructed in accordance with my invention;

Figure 2 is a fragmentary plan view of one of the endless aprons embodied in the invention;

Figure 3 is a longitudinal sectional view of the same;

Figure 4 is a fragmentary top plan view of a second type of endless apron embodied in the invention;

Figure 5 is a longitudinal sectional view of the same;

Figure 6 is a fragmentary detail view; and

Figure 7 is a fragmentary vertical sectional view of the cleaner shoe embodied in the invention;

Figure 8 is a vertical sectional view of the same taken on line 8—8 of Figure 7;

Figure 9 is a vertical sectional view taken on line 9—9 of Figure 1, and

Figure 10 is a fragmentary view partly in plan and partly in section of the straw cutting element employed in the invention.

Referring to the drawing in detail wherein the corresponding characters of reference denote corresponding parts throughout the several views, the numeral 5 designates a wheeled body of a thrashing machine and 6 the feed hopper therefor, into which the wheat or other grain carrying straw is placed and carried forwardly by an endless apron 7 arranged in the bottom of this hopper. A conventional thrashing cylinder is designated at 8 and above the same is a conventional beater 9.

A blower or fan casing is designated at 10 and is disposed transversely of the body 5 and forwardly of the beater 9 and includes an upwardly curved wall 11. An endless apron 12 is movable over the longitudinally curved wall 11 and has its lower part engaged with a roller 13 journaled in the frame 5 between the fan 10 and thrashing cylinder 8. The upper part of the apron 12 is engaged with a similar roller 14 arranged transversely of the body and arranged in proximity to this roller 14 and the upper end of the wall 11 is a pair of coacting beaters 15. A second fan is designated at 16 and is identical to the fan 10 and movable over the upper curved wall of the housing of this fan 16 is a second endless apron 17 identical to the apron 12, both of these aprons being provided with transversely extending longitudinal ribs 18 which are substantially triangular in cross section. From the description thus far given, it follows that the straw is placed upon the conveyor 7, passes under the thrasher cylinder 8 and is thence carried upwardly over the conveyor 12 and operated upon by the beaters 9 and 15. The separated grain falls from the conveyor 12 and beaters 15 onto the conveyor or endless apron 17 and carried in the direction of the arrows, by means of the ribs 18 on this conveyor 17.

A conveyor 20 is arranged at an incline in the body 5 and is disposed between the beaters 15 and endless apron or conveyor 17, that is this conveyor 20 is arranged to receive the straw from the beaters 15. The conveyor 20 comprises guide chains 21 and spaced transverse bars 22 and is adapted to carry the straw rearwardly to a beater 23. A conveyor 24 identical to the conveyor 20 is arranged in horizontal alinement with the beater 23 and in advance of the same and carries the straw to the forward end of the body 5 as shown in Figure 1, the straw continuing downwardly to a pair of coacting rotary cutters 25 journaled in the bottom of the forward end of the body 5, these cutters being operatively connected together by a pinion 26'. Arranged below the cutters 25 is a conventional screw conveyor 26 for conducting the chaffed or cut straw to one side of the body 5 and discharged in the usual manner.

In accordance with the present invention, there is provided a separator or shoe and consists of a tapered frame 27 to which a series of screens 28 are attached and which are arranged one above the other. These screens are of a graduated mesh so as to thoroughly separate the grain from any foreign matter. As shown in Figure 1, this shoe or separator is mounted in advance of the fan 16 and below the discharge end of the conveyor 17. A housing 29 is carried by the inner face of one of the side walls of the frame 27 and passing therethrough is a horizontally arranged driven shaft 30 which carries an eccentric 31 received in the housing 29 which upon rotation of the shaft 30 vibrates or shakes the shoe. This shoe is normally retained in a substantially horizontal position by means of flexible elements 32 which are attached to the forward end of the frame 27 and extend vertically through the top of the body 5. The transverse rock shaft 33 is journaled upon the top wall of the body 5 and carried thereby is a pair of normally angularly disposed arms 34 to which the upper ends of the flexible elements 32 are attached. An arm 35 is fixed to one end of this shaft 33 and carries a weight 36 at its lower end which normally holds the arms in the position shown in Figure 1 and consequently lifts the free end of the shoe to a substantially horizontal position. However, should the straw or other foreign matter accidentally become lodged on the upper screen 28, the weight of the straw will weight the shoe downwardly to a tilted position and allow the straw to gravitate onto the cutting knives 25.

A chute or inclined wall 37 is arranged beneath the conveyor 24 and is positioned so that its lower end overlies the uppermost screen 28 to discharge any grain that may be carried with the straw on the conveyor 24.

As shown in Figure 1, the greater part of the grain is discharged onto the upper screen 28 from the conveyor 17 and passes through the series of screens and discharged in the hopper 38. As the grain drops through these series of screens the blast from the fan 16 passes between these screens and blows the chaff and foreign matter through the outer end of the shoe and in the direction of travel of the straw.

While I have shown and describel the preferred embodiment of the invention, it is to be understood that changes in the arrangement of parts may be made and that I am only limited by the appended claim.

What is claimed is:—

In a thrashing machine, the combination with a screening means, of curved walls arranged in parallel pairs with one pair disposed in advance of the other and both of the pairs rising from the bottom of the machine, an endless apron for each pair of walls and being guided thereby, substantially triangular in cross section ribs transversely secured on each apron, a thrashing cylinder arranged in the path of incoming grain to be thrashed and said cylinder being disposed adjacent the bottom of the apron of the forward pair of walls, a beater cooperating with the thrashing cylinder to receive the grain therefrom, co-acting beaters arranged adjacent the upper end of the last mentioned apron and above the other apron, fans arranged below the aprons said co-acting beaters being adapted to separate the grain from the straw while the last mentioned apron is adapted to receive the separated grain, and said screening means being arranged to receive the grain therefrom.

In testimony whereof I affix my signature.

FREDRICK L. ELDER.